Patented Sept. 6, 1938

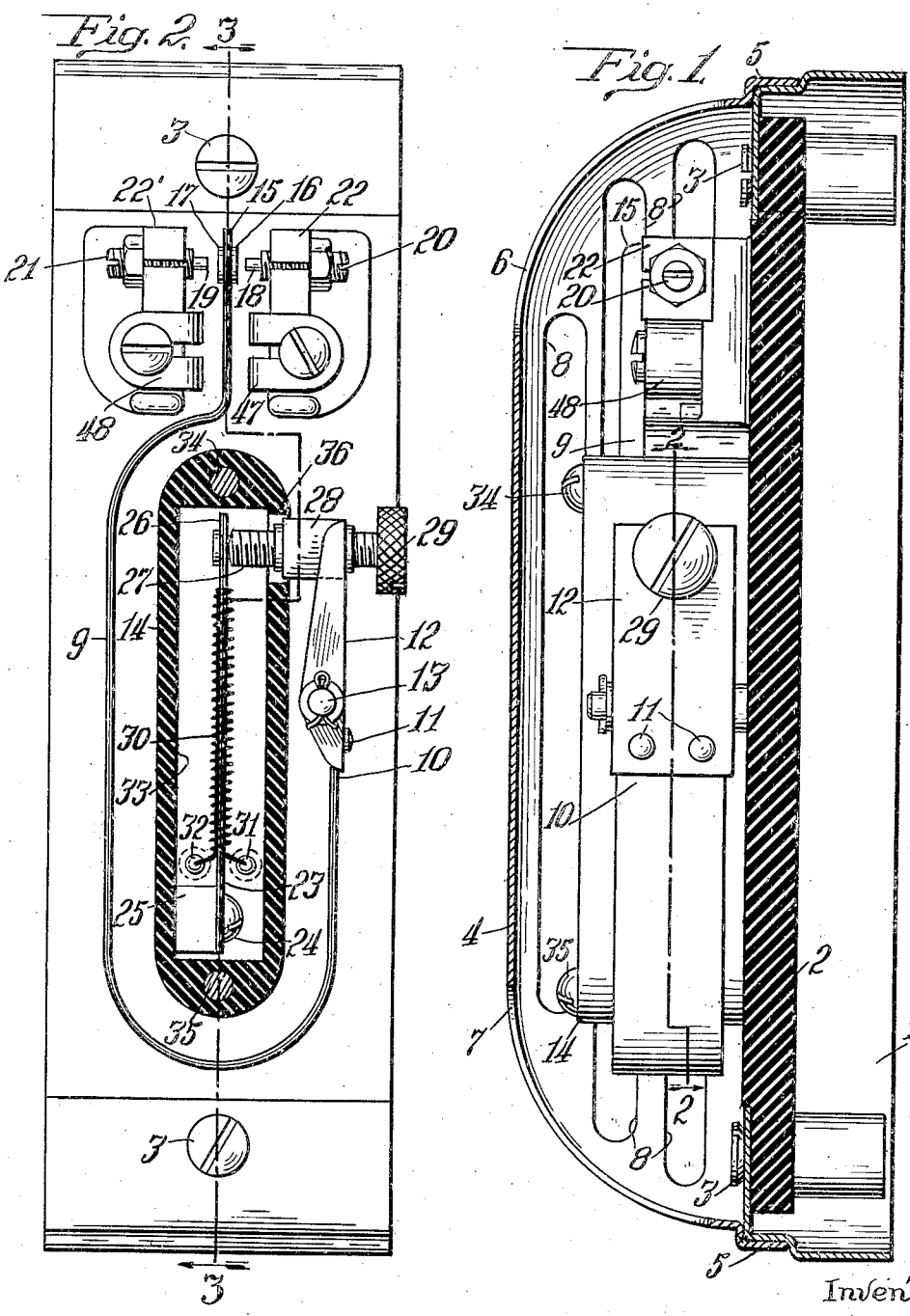

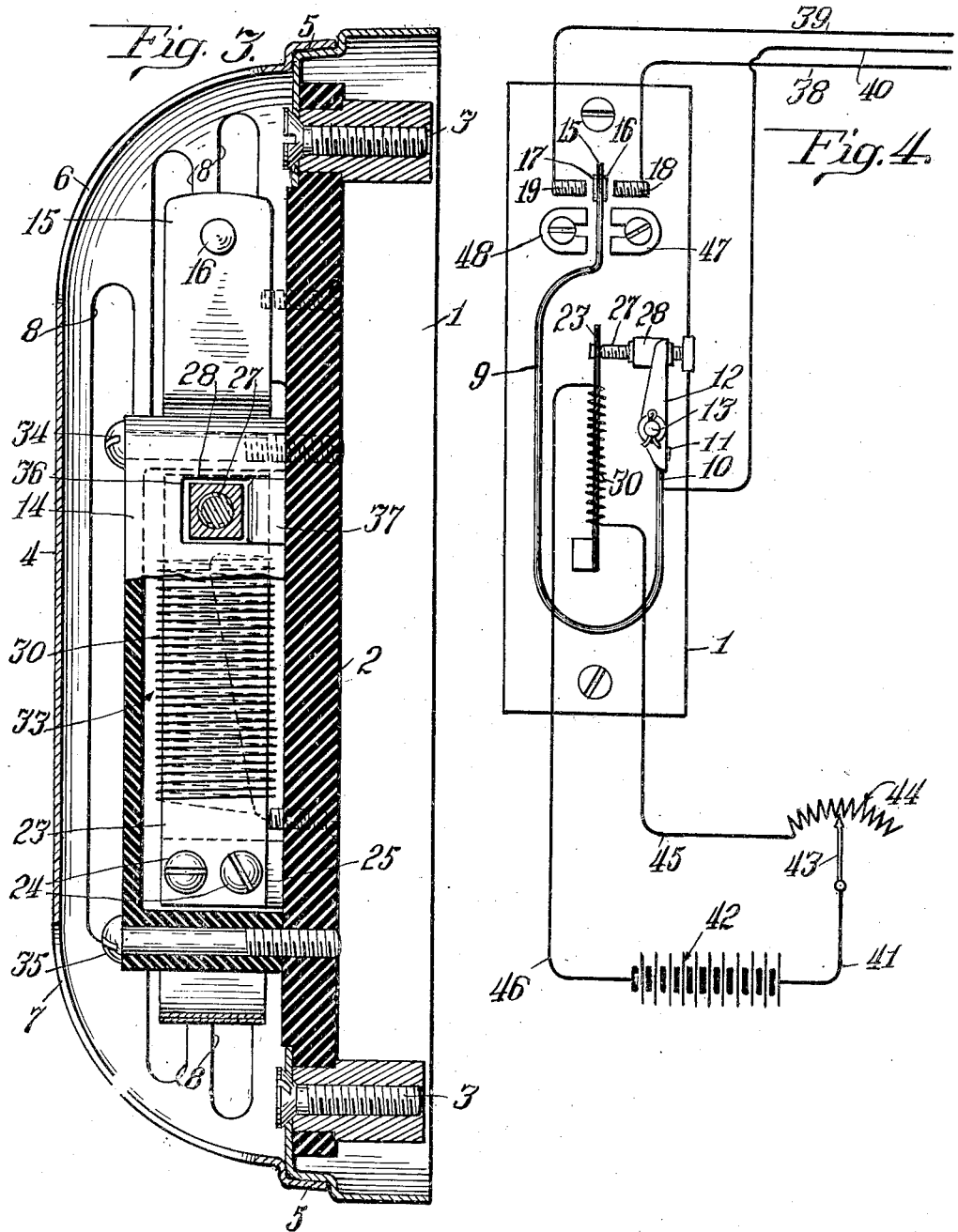

2,129,477

UNITED STATES PATENT OFFICE 2,129,477

ADJUSTABLE METALLIC THERMOSTAT

Paul B. Parks, Oak Park, Ill., assignor to Vapor Car Heating Company, Inc., Chicago, Ill., a corporation of New York Application September 20, 1937, Serial No. 164,779

12 Claims. (Cl. 200—122)

This invention relates to certain new and useful improvements in thermostats or similar controlling instruments, especially thermostats of the bi-metallic type having a portion movable in response to atmospheric temperature changes to which the bi-metallic member is exposed so as to operate some controlling mechanism, usually by making or breaking electric circuits.

According to the present invention, means is provided for conveniently adjusting the operation of the control instrument, for example selecting the temperature or temperatures at which the instrument will function. A localized portion of the thermostatic member, or more conveniently a second thermostatic member fixed at one end and adjustably connected at the other end with the relatively fixed portion of the main thermostat, is confined within a casing along with an auxiliary heater so that the heat output of this heater will be locally applied to the second thermostat only, and this second thermostat will not be influenced by air currents to which the main thermostat responds. By adjusting the auxiliary heat applied to the second thermostat (or the isolated portion of the main thermostat) the main thermostatic member which is exposed to the air and responds to atmospheric temperature changes will be bodily adjusted so as to determine the temperatures or other predetermined atmospheric conditions at which the instrument will function. More specifically an electric heating coil is positioned around the second thermostatic bar (or some other type of electric heating element is intimately associated therewith) and both the bar and electric heater are enclosed in an insulating casing which is entirely closed except for a passage for the movable member by which adjustable connection is made with the anchored or relatively fixed portion of the main thermostat. In this manner the auxiliary heat is localized and applied only to the auxiliary or adjusting thermostatic member which is shielded from air currents, whereas the main exposed thermostatic member is shielded as far as possible from the auxiliary heat so as to respond only to atmospheric temperature changes.

The principal object of this invention is to provide an improved controlling instrument such as briefly described hereinabove and disclosed more in detail in the specifications which follow.

Another object is to provide an improved adjustable metallic thermostat.

Another object is to provide an improved adjusting means for a controlling instrument.

Another object is to provide improved means for localizing as far as possible the application of auxiliary heat for adjusting the temperature at which the thermostats will function.

Other objects and advantages of this invention will be more apparent from the following detailed description of one approved form of thermostat constructed and operating according to the principles of this invention.

In the accompanying drawings:

Fig. 1 is a side elevation of the instrument, the base and the outer covering shield being shown in vertical section.

Fig. 2 is a plan view with the outer cover removed and the insulating casing for the auxiliary thermostat and heater being shown in section substantially on the line 2—2 of Fig. 1.

Fig. 3 is a vertical section taken substantially on the line 3—3 of Fig. 2.

Fig. 4 is a wiring diagram.

The thermostat comprises the hollow metallic base member 1, open at the back, in which the base plate of insulating material 2 is secured by screws 3. The operating parts are mounted on the front face of plate 2, and the electrical connections are made in the usual manner at the back of plate 2. The operating mechanism is enclosed by a dished metallic cover or shield 4 provided with a flange or rim 5 which fits over a portion of base 1 and may be removably secured thereto in any desired manner. Cover 4 is provided with slots or openings 6 and 7 in its upper and lower ends, and also preferably with openings 8 in the sides so that a free circulation of air is permitted through the cover or casing so that the main thermostatic member may respond quickly to room temperatures.

The main thermostatic member 9 is in the form of a bi-metallic bar having one end 10 fixed at 11 on an anchoring member 12 pivotally mounted on a pin 13 extending outwardly from base plate 2. The bar 9 is bent or looped so as to extend practically around the inner insulating casing 14 (hereinafter described in detail) and the upper free end 15 of the bar carries a pair of electrical contacts 16 and 17 adapted to engage respectively with the relatively fixed contacts 18 and 19. While the contacts 18 and 19 are normally fixed they are preferably mounted on the inner ends of screws 20 and 21 respectively mounted in the fixed members 22 and 22' so that the positions of the so-called "fixed" contacts may be adjusted. It will be understood that as the temperature of the air to which bar 9 is exposed rises or falls, this bar will flex or bend in one direction or the other. For example, if the temperature rises to a predetermined temperature the bar may flex so as to bring movable contact 16 into engagement with fixed contact 18, and conversely if the temperature falls sufficiently contact 17 will be brought into engagement with contact 19. It will be understood that circuit wires (hereinafter referred to) connect with suitable binding posts on the back of base 2, these wires leading from the fixed contacts 18, 19 and from the relatively fixed end portion of bar 9 respectively.

The end portion 10 of the thermostatic bar 9 may be considered as fixed as far as the movements of this bar in respect to atmospheric temperature changes is concerned, but for the purpose of adjusting the temperatures at which the thermostat will function the bar 9 is swung bodily in one direction or the other by moving the pivoted anchorage 12 to which the relatively fixed end of bar 9 is secured.

The improved adjusting means comprises a second thermostatic bar 23 having its lower end fixed at 24 to a block 25 projecting from the base plate, and the upper free end portion 26 of this thermostatic bar is connected with an adjusting screw 27 threaded through a block 28 connected with anchoring member 12. It will be apparent that as the auxiliary thermostatic bar 23 flexes in one direction or the other it will, through screw 27, move the anchorage 12 and thereby bodily adjust the position of the main thermostat 9. The head 29 of screw 27 is conveniently positioned so that a permanent or factory adjustment may be made by turning the screw 27. As far as the automatic operation is concerned the free end 26 of auxiliary thermostat 23 may be considered as fixedly secured with the relatively fixed end 10 of main thermostat 9, and as a matter of fact these two thermostats may be considered as parts of the same thermostatic means, or might be parts of the same thermostatic bar.

An electric heating element is intimately associated with the thermostat 23, this heating element being preferably in the form of a coil 30 wrapped around the thermostatic bar and having its terminals connected respectively to the screws 31 and 32 which extend through base plate 2 so that the connections for the energizing circuit may be conveniently made at the back of the instrument.

The thermostat 23 and heater 30 are confined within the chamber 33 formed in insulating casing 14 hereinabove referred to. This casing 14 may be metallic, but is preferably formed of some material having good insulating properties so as to limit as far as possible the transmission of heat therethrough and localize the effect of heater 30 to the thermostat 23, while at the same time protecting this thermostat from the air currents to which the main thermostat 9 is responsive. The casing 14 is preferably secured to the base plate 2 by means of screws 34 and 35, and is formed with a slot 36 in one side adapted to be slipped over the screw 27 or block 28, a member 37 projecting forwardly from base plate 2 closing the inner portion of this slot so that the remaining passage or opening through the casing 14 is only sufficient to permit the necessary movement of the flexible connection between the inner thermostat 23 and the anchoring member 12.

Referring now to the wiring diagram shown in Fig. 4, circuit wires 38 and 39 are shown leading to the fixed contacts 18 and 19 respectively, whereas a third wire 40 leads to the thermostatic bar 9 and thence to the movable contacts 16 and 17. Assuming that the thermostatic bar 9 is so constructed as to swing to the right at its upper end when heated, at a certain predetermined maximum temperature the contacts 16 and 18 will be engaged to complete a circuit between wires 38 and 40 and we may assume that through certain appropriate control mechanism this circuit will cause a cooling system to be thrown into operation or a heating system to be thrown out of operation. Conversely, when the temperature at thermostat 9 is lowered so that contacts 17 and 19 engage a circuit will be completed through wires 39 and 40 to cut off the cooling mechanism or start the heating mechanism. Alternatively, the circuit connection to one of the contacts (for example contact 19) might be omitted and only the contacts 16 and 18 be used to make or break the circuit between wires 38 and 40 thus stopping or starting the controlled mechanism.

The heating circuit for energizing the auxiliary heater 30 comprises the wire 41 leading from one terminal of the source of current 42, the movable contact 43 of the rheostat or variable resistance 44, wire 45 leading from resistance 44 to one terminal of heater 30, and wire 46 leading back to the source of current 42. It will now be seen that as rheostat contact 43 is adjusted, the strength of the current flowing through coil 30 will be varied and thereby the heat output adjusted to determine the extent to which thermostat 23 will be flexed or bowed in one direction or the other thereby moving the pivoted anchorage 12 to bodily adjust the position of main thermostat 9 for any given atmospheric temperature. In this manner the temperatures at which contact will be established between either of the pairs of contacts 16—18 or 17—19 may be adjusted at any time by simply adjusting the strength of the energizing current for auxiliary heater 30.

The insulating case 14 tends to confine the heat output of this auxiliary heater 30 to the secondary thermostat 23 while at the same time shielding this adjusting thermostat from the varying air currents which flow through the outer casing 4. In this manner the main thermostat 9 is made, as far as possible, responsive only to changes in temperature in the atmosphere of the room or other space in which the thermostat is located, whereas auxiliary adjusting thermostat 23 is responsive only to the auxiliary heat furnished by electric heater 30. Preferably, magnetic detents in the form of adjustably positioned permanent magnets 47 and 48 are positioned adjacent opposite sides of the movable end portion of thermostatic bar 9. For example, magnet 47 is so positioned that when contacts 16 and 18 are engaged the thermostatic bar is brought closely enough to the poles of magnet 47 to be strongly attracted thereby so that the contacts 16 and 18 will be held in engagement until a temperature change applied to bar 9 exerts sufficient force on this bar in an opposite direction to break the magnetic attraction and snap apart the contacts 16 and 18. This prevents chattering at the contacts and excessive making and breaking of the control circuits.

This same type of adjusting mechanism could be applied in a similar manner to other types of controlling instruments, for example a humidostat.

As has already been noted, the connecting means here shown by way of example between the two thermostatic members 23 and 9, said connecting means comprising screw 27, block 28, and anchoring member 12, may take a variety of forms and is principally for the purpose of providing means for a permanent adjustment between these two members (usually an adjustment made at the factory). All of this might be omitted and the two thermostatic members fixedly connected or formed as a unit, as far as the broader principles of the invention are concerned.

I claim:

1. A controlling instrument comprising a control member having an operating portion movable in relation to a relatively fixed portion in response to predetermined changes in atmospheric conditions, a bi-metallic thermostat having a portion movable in response to temperature changes, means connecting the movable portion of the thermostat with the relatively fixed portion of the control member, a heat localizing casing enclosing the thermostat, a heater within the casing and intimately associated with the thermostat, and means for adjustably controlling the heat output of the heater.

2. A controlling instrument comprising a control member having an operating portion movable in relation to a relatively fixed portion in response to predetermined changes in atmospheric conditions, a bi-metallic thermostat having a portion movable in response to temperature changes, means adjustably connecting the movable portion of the thermostat with the relatively fixed portion of the control member, a heat localizing casing enclosing the thermostat, a heater within the casing and intimately associated with the thermostat, and means for adjustably controlling the heat output of the heater.

3. A controlling instrument comprising a control member having an operating portion movable in relation to a relatively fixed portion in response to predetermined changes in atmospheric conditions, a thermostat having a portion movable in response to temperature changes, a movable anchorage for the relatively fixed portion of the control member, means adjustably connecting the movable portion of the thermostat with the anchorage to move the same and thereby adjust the operation of the control member, a heat localizing casing enclosing the thermostat, a heater within the casing and intimately associated with the thermostat, and means for adjustably controlling the heat output of the heater.

4. A controlling instrument comprising a control member having an operating portion movable in relation to a relatively fixed portion in response to predetermined changes in atmospheric conditions, a thermostat having a portion movable in response to temperature changes, a movable anchorage for the relatively fixed portion of the control member, means adjustably connecting the movable portion of the thermostat with the anchorage to move the same and thereby adjust the operation of the control member, a heat localizing casing enclosing the thermostat, an electric heating element intimately associated with the thermostat, an energizing circuit for the heating element, and means for adjustably controlling the current in the energizing.

5. A controlling instrument comprising a control member having an operating portion movable in relation to a relatively fixed portion in response to predetermined changes in atmospheric conditions, a bi-metallic thermostat having a portion movable in response to temperature changes, means adjustably connecting the movable portion of the thermostat with the relatively fixed portion of the control member, a heat localizing casing enclosing the thermostat, an electric heating element intimately associated with the thermostat, an energizing circuit for the heating element, and means for adjustably controlling the current in the energizing circuit.

6. A thermostat comprising a bi-metallic bar having an operating portion movable with respect to a relatively fixed portion in response to temperature changes of the atmosphere to which the bar is exposed, a movable anchorage for the relatively fixed portion of the bar, a second bi-metallic bar fixed at one end and secured at the other movable end to the movable anchorage, an electric heating element intimately associated with the second bi-metallic bar, an energizing circuit for the heating element, means for adjusting the current in this circuit, and an insulating casing confining the second bi-metallic bar and the heating element to restrict the effect of the heating element to the second bar and protect the second bar from air currents.

7. A thermostat comprising a bi-metallic bar having an operating portion movable with respect to a relatively fixed portion in response to temperature changes of the atmosphere to which the bar is exposed, a movable anchorage for the relatively fixed portion of the bar, a second bi-metallic bar fixed at one end and adjustably secured at the other movable end to the movable anchorage, an electric heating element intimately associated with the second bi-metallic bar, an energizing circuit for the heating element, means for adjusting the current in this circuit, and an insulating casing confining the second bi-metallic bar and the heating element to restrict the effect of the heating element to the second bar and protect the second bar from air currents.

8. A thermostat comprising a bi-metalic bar having an operating portion movable with respect to a relatively fixed portion in response to temperature changes of the atmosphere to which the bar is exposed, a pivoted anchoring member on which the relatively fixed portion of the bar is mounted, a second bi-metallic bar fixed at one end, an adjusting member connecting the movable end of the second bar with the pivoted anchoring member, an electric heating element intimately associated with the second bar, an energizing circuit for the heating element, means for adjusting the current in this circuit, and an insulating casing confining the second bar and heating element to restrict the effect of the heating element to the second bar.

9. A thermostat comprising a bi-metallic bar, a movable anchoring member to which one end of the bar is secured, a pair of electric contacts one of which is relatively fixed and the other carried by the movable end of the bar so that a circuit through the contacts will be made and broken in response to atmospheric temperature changes to which the bar is exposed, a second thermostatic bar fixed at one end, an adjustable connection between the movable end of this bar and the anchoring means, a casing enclosing the second bar, a heater within the casing and intimately associated with the second thermostat to locally apply heat thereto, and means for adjusting the heat output of the heater.

10. A thermostat comprising a bi-metallic bar, a pivoted anchoring member to which one end of the bar is secured, a pair of electric contacts one of which is relatively fixed and the other carried by the movable end of the bar so that a circuit through the contacts will be made and broken in response to atmospheric temperature changes to which the bar is exposed, a second thermostatic bar fixed at one end, an adjustable connection between the movable end of this bar and the anchoring means, a casing enclosing the second bar, a heater within the casing and intimately associated with the second thermostat to locally apply heat thereto, and means for adjusting the heat output of the heater.

11. A thermostat comprising a bi-metallic bar, a movable anchoring member to which one end of the bar is secured, a pair of electric contacts one of which is relatively fixed and the other carried by the movable end of the bar so that a circuit through the contacts will be made and broken in response to atmospheric temperature changes to which the bar is exposed, a second thermostatic bar fixed at one end, an adjustable connection between the movable end of this bar and the anchoring means, a casing enclosing the second bar, an electric heating element intimately associated with the second bar, an energizing circuit for this heater, and means for adjusting the energizing circuit.

12. A thermostat comprising a bi-metallic bar, a movable anchoring member to which one end of the bar is secured, a pair of electric contacts one of which is relatively fixed and the other carried by the movable end of the bar so that a circuit through the contacts will be made and broken in response to atmospheric temperature changes to which the bar is exposed, a magnetic detent positioned to attract the bar and yieldingly hold the contacts in engagement, a second thermostatic bar fixed at one end, an adjustable connection between the movable end of this bar and the anchoring means, a casing enclosing the second bar, a heater within the casing and intimately associated with the second thermostat to locally apply heat thereto, and means for adjusting the heat output of the heater.

PAUL B. PARKS.